United States Patent
Uno

(10) Patent No.: US 6,974,714 B2
(45) Date of Patent: Dec. 13, 2005

(54) PROCESS FOR MAKING LIGHT WAVEGUIDE ELEMENT

(75) Inventor: Yutaka Uno, Tokyo (JP)

(73) Assignee: Oki Electric Industry, Co., Ltd., Tokyo (JP)

( * ) Notice: Subject to any disclaimer, the term of this patent is extended or adjusted under 35 U.S.C. 154(b) by 241 days.

(21) Appl. No.: 10/238,652

(22) Filed: Sep. 11, 2002

(65) Prior Publication Data

US 2003/0118309 A1 Jun. 26, 2003

(30) Foreign Application Priority Data

Dec. 26, 2001 (JP) .................................. 2001-395157

(51) Int. Cl.$^7$ ............................................. H01L 21/20
(52) U.S. Cl. ............................................. 438/31
(58) Field of Search ....................... 438/22–47; 385/129

(56) References Cited

U.S. PATENT DOCUMENTS

| | | | | |
|---|---|---|---|---|
| 5,563,979 A | * | 10/1996 | Bruce et al. ................ | 385/142 |
| 5,904,491 A | * | 5/1999 | Ojha et al. ................... | 438/31 |
| 6,501,895 B1 | * | 12/2002 | Bloechl et al. ............. | 385/129 |
| 2001/0046363 A1 | * | 11/2001 | Purcahse et al. ........... | 385/140 |

* cited by examiner

Primary Examiner—Savitri Mulpuri
(74) Attorney, Agent, or Firm—Takeuchi & Kubotera, LLP

(57) ABSTRACT

A process for making a light waveguide element is made by forming only an upper clad layer (40) and a core layer (32) without etching an optical axis height-adjusting sections. By using plasma chemical vapor deposition (CVD) which is good at controlling the film thickness, it is possible to provide without difficulty a light waveguide element with a height-adjusting section that has a precise film thickness, making it possible to provide precise optical axis vertical alignment upon mounting. By forming alignment markers in the same photolithography as that of the core formation, it is possible to provide precise horizontal optical axis alignment.

5 Claims, 9 Drawing Sheets

PROCESS FOR MAKING LIGHT WAVEGUIDE ELEMENT

BACKGROUND OF THE INVENTION

1. Field of the Invention

The present invention relates to a process for making an economical light waveguide element mounted on a mount board along with an optical fiber and photoelectric components and enabling precise optical axis alignment.

2. Description of the Related Art

Japanese patent application Kokai No. 10-133069 discloses a method of mounting a light waveguide element, by which the light waveguide element is mounted on the same silicon substrate along with the optical fiber and photoelectric components to which the light waveguide element is connected. It is mounted such that the upper surface of the light waveguide element layer faces the standard surface of the silicon substrate so that the thickness of the clad layer of the light waveguide element is adjusted to match the optical axis height from the silicon substrate of the optical fiber and photoelectric components. That is, the optical axis adjustment is made by only the mounting precision of each optical component to provide an economic light transmission module.

The thickness of the upper clad layer for the light waveguide element must be 15 $\mu$m or more for light propagation characteristics. The general optical axis height of the semiconductor laser and photodiodes is approx. 10 $\mu$m so that it is necessary to make the upper clad layer approx. 10 $\mu$m thick. Consequently, the upper clad layer has a T-shaped section that is thick above the core and thin at the height-adjusting sections. In order to provide such a T-shaped layer, a conventional technique comprises forming an upper clad layer having a thickness of approx. 15 $\mu$m and etching off, by reactive ion etching or the like, only the height-adjusting sections of the upper clad layer.

In such a conventional method, however, the etching rate depends on the etching depth and the reaction product adhered to the chamber so that it is difficult to make the etching stable. Consequently, it has been necessary to take height measurements and repeat the etching with correction. In addition, if overetching is made, it is necessary to deposit an additional upper clad, increasing the number of process steps.

Moreover, variations in the etching rate in the chamber or the wafer surface make it difficult to provide uniform etching between wafers or within the wafer surface, resulting in the reduced yield. Thus conventional process has low productivity and fails to produce the light waveguide element economically.

SUMMARY OF THE INVENTION

Accordingly, it is an object of the invention to provide a process for making a light waveguide element enabling precise optical axis alignment.

According to the invention there is provided a process for making a light waveguide element mounted on a mount board along with an optical fiber and photoelectric components, comprises the steps of forming a core as a light path on a substrate serving as a lower clad layer and forming a T-shaped upper clad layer having a central section elevated from opposite-side optical axis height-adjusting sections to cover said core.

According to the first embodiment of the invention there is provided a process for making a light waveguide element mounted on a mount board along with an optical fiber and photoelectric components, comprises the steps of forming a core on a substrate serving as a lower clad layer; patterning an etching stopper film on opposite sides of said core including an area of said optical axis height-adjusting sections; forming a first upper clad layer over an entire surface including said etching stopper film, said core, and said substrate; forming an etching mask on said first upper clad layer so as to cover an area above said core; etching off a portion of said first upper clad layer that is other than said area covered by said etching mask until said etching stopper film is exposed; removing said etching stopper film and said etching mask; and forming a second upper clad layer over an entire surface including said first upper clad layer and said substrate.

According to the second embodiment of the invention there is provided a process for making a light waveguide element, wherein said T-shaped clad layer-forming step comprises the steps of forming both said core and a first height-adjusting layer on said substrate; patterning an etching stopper film on said first height-adjusting layer; forming a first upper clad layer over an entire surface including said core and said etching stopper film; forming an etching mask on said first clad layer to cover an area above said core; etching off a portion of said first upper clad layer that is other than said area covered by said etching mask until said etching stopper film is exposed; removing only said etching mask; and forming a second upper clad layer over an entire surface including said etching stopper film, said first upper clad layer.

According to the third embodiment of the invention there is provided a process for making a light waveguide element, wherein said T-shaped clad layer-forming step comprises the steps of depositing a core film on an entire surface of said substrate; patterning an etching stopper film and a core pattern-forming etching mask on areas of said core film on which optical axis height-adjusting sections and a core are made, respectively; forming a first clad layer over an entire surface including said etching stopper film, a core pattern-forming etching mask, and said core film; forming a marker etching mask so as to cover an area above said etching stopper film; etching off a portion of said first upper clad layer other than said area covered by said marker etching mask and said core layer; removing only said core pattern-forming etching mask; forming a second upper clad layer over an entire surface; forming an etching mask on said second upper clad layer so as to cover an area above said core; etching off a portion of said second clad layer other than said area covered by said etching mask until said marker etching mask is exposed; and removing said marker etching mask and said etching mask.

Not only the required thickness of the upper clad layer thus made is provided but also the optical axis height-adjusting sections facing the mount standard plane are made by only the film-forming step without the etching step so that variations in the etching rate and etching itself have no influence on the production, with high yields, of the light waveguide element that enables precise optical axis alignment.

It is preferred that said T-shaped upper clad layer is made 15 $\mu$m thick or more to assure the required thickness for light propagation characteristics. The optical axis height-adjusting sections may made so as to have a thickness from said lower clad layer equal to the sum of a half of a thickness of said core and an optical axis height of said optical fiber and said photoelectric components to enable precise vertical optical axis alignment with the optical fiber and photoelectric components. The core and said upper clad layer may be made by plasma chemical vapor deposition to minimize variations in the film thickness within the wafer and enable precise control of the film thickness, thus maximizing the yield and providing precise optical axis height-adjusting sections.

DESCRIPTION OF THE PREFERRED EMBODIMENTS

Figure 1:
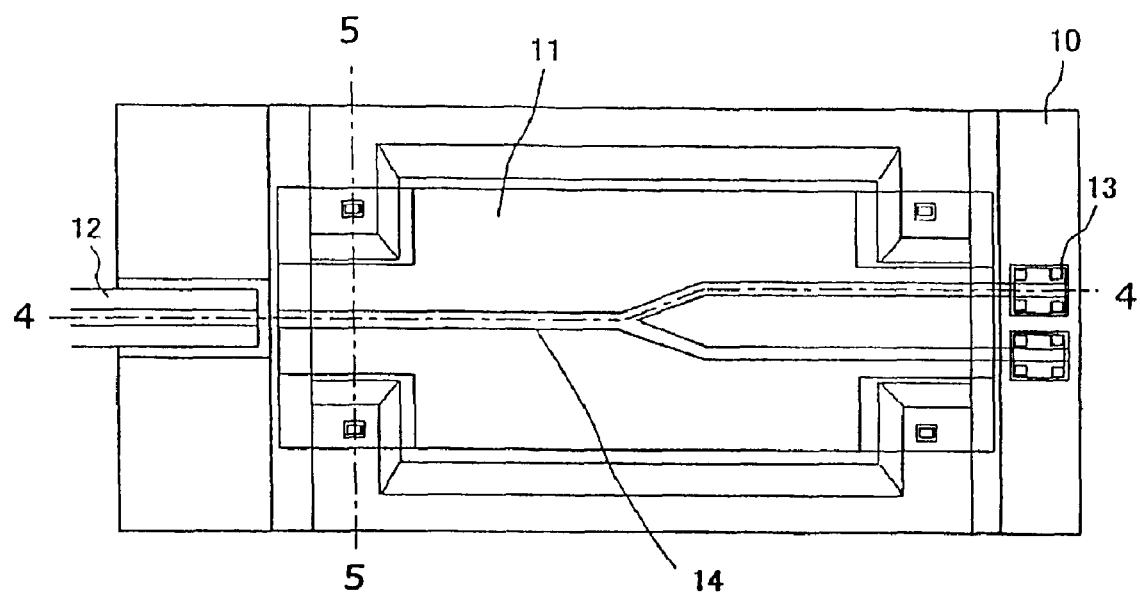
FIG. 1 is a plan view of a light waveguide element mounted on a mount board according to an embodiment of the invention.
Figure 2:
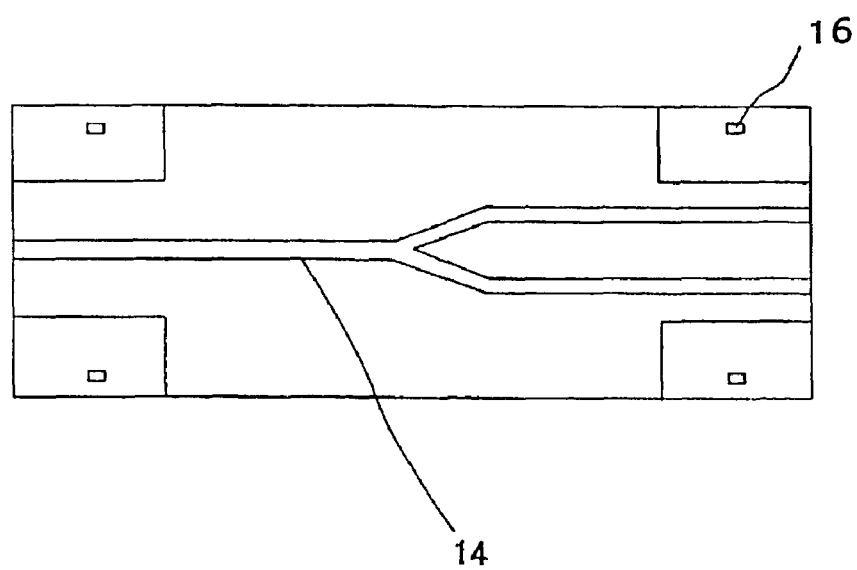
FIG. 2 is a plan view of the light waveguide element.
Figure 3:
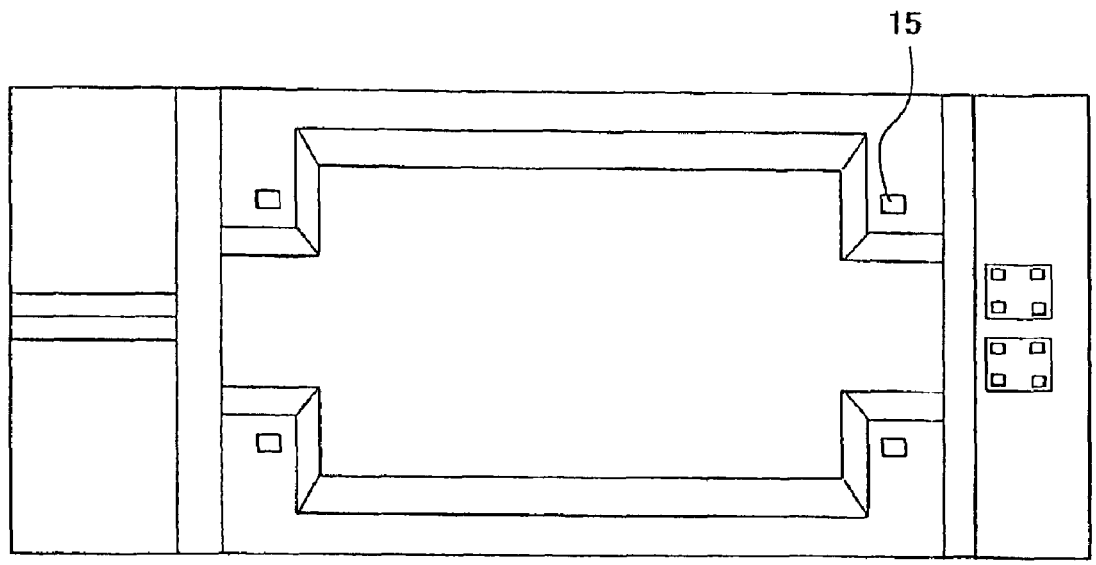
FIG. 3 is a plan view of the mount board.
Figure 4:
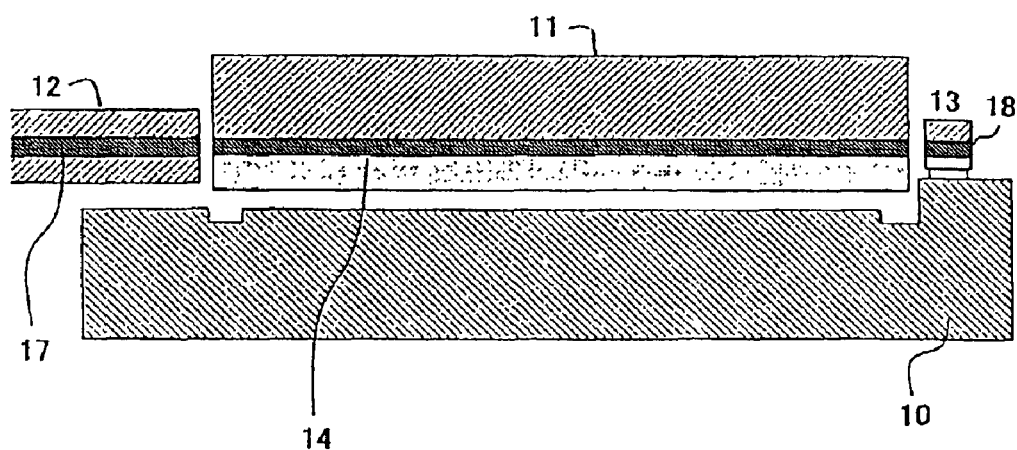
FIG. 4 is a sectional view taken along line 4—4 of FIG. 1.
Figure 5:
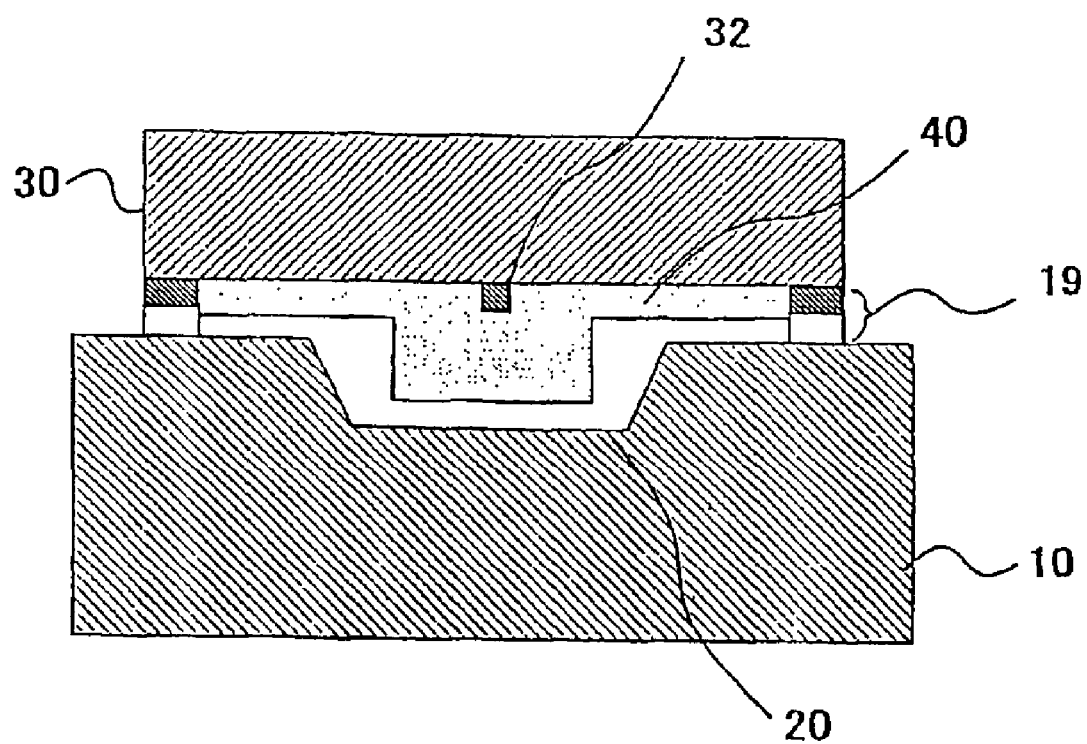
FIG. 5 is a sectional view taken along line 5—5 of FIG. 1.

In FIGS. 1–5, a light waveguide element 11 is mounted face-down on a mount board 10 such that alignment markers 16 are aligned with alignment markers 15 of the mount board 10 for positioning the light waveguide element 11 in the horizontal direction with respect to the mount board 10. As best shown in FIG. 5, the positioning in the vertical direction is made by the thickness of an optical axis height-adjusting section 19. Consequently, it is important to form the alignment markers 16 enabling precise alignment in the horizontal direction between the core 14 of the light waveguide element 11 and an optical fiber 12 and photo-semiconductor elements 13 mounted on the mount board 10.

Figure 6A:
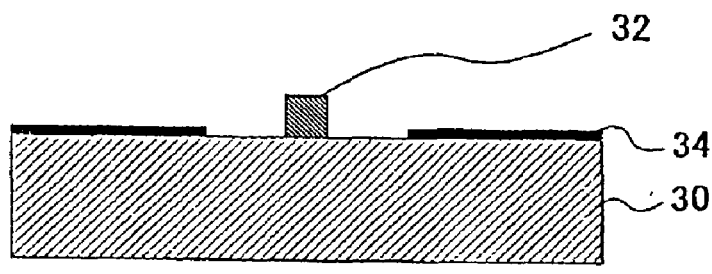
FIGS. 6(a)–(e) show how to make a light waveguide element according to the first embodiment of the invention.

In FIG. 6(a), a core 32 and an etching stopper film 34 are formed on a lower clad layer or board 30. A quartz board is used for the board 30 to match the refractive index of an upper clad layer. The core 32 is made of a quartz glass containing a dopant of germanium (Ge) so as to provide a refractive index higher than the clad layer. It is made by forming a film having a thickness of 5.0 $\mu$m by the plasma chemical vapor deposition (CVD) with a liquid source and then making patterning by photolithography or reactive ion etching. The etching stopper 34 is made by, prior to the formation of the core 32, forming by spattering a metal film having a thickness of about 0.5 $\mu$m and containing mainly tungsten that has a high etching selection ratio with respect to the quartz film and then making patterning by photolithography or reactive ion etching.

Figure 6B:
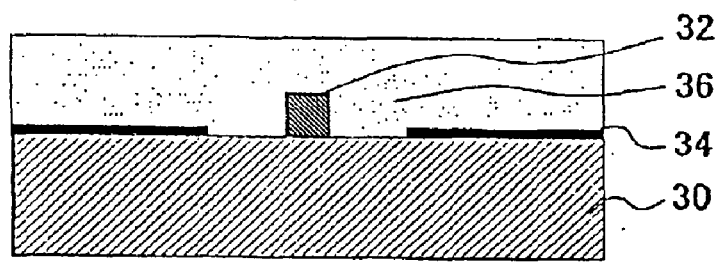
Figure 6C:
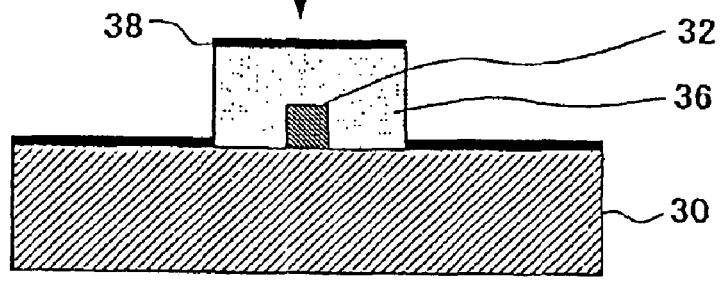

In FIG. 6(b), the first upper clad layer 36 is made by forming in the plasma CVD a quartz film having a thickness of 5 $\mu$m and then an etching mask 38 over the core 32. The etching mask 38 is made by the same process as that of the etching stopper film 34. Then, the reactive ion etching is employed to etch the portion of the first clad layer 36 that is not covered by the etching mask 38. It is continued until at least the etching stopper film 34 is exposed. See FIG. 6(c).

Figure 6D:
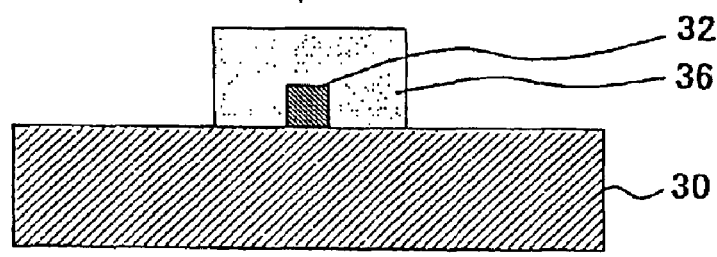

In FIG. 6(d), both the etching stopper film 34 and the etching mask 38 are removed.

Figure 6E:
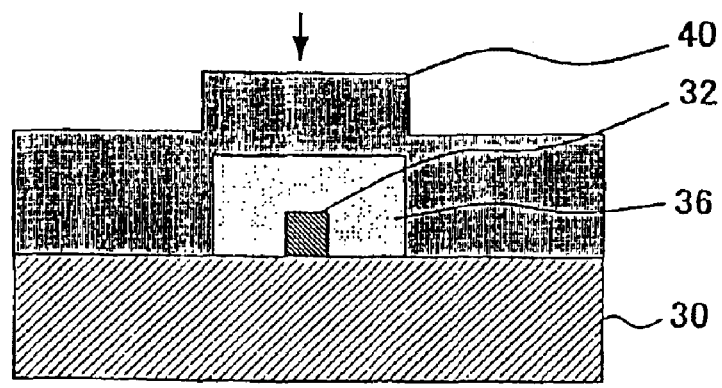

In FIG. 6(e), the second upper clad-layer 40 is made by forming a quartz film having a thickness of 11.5 $\mu$m by means of the plasma CVD.

Figure 7:
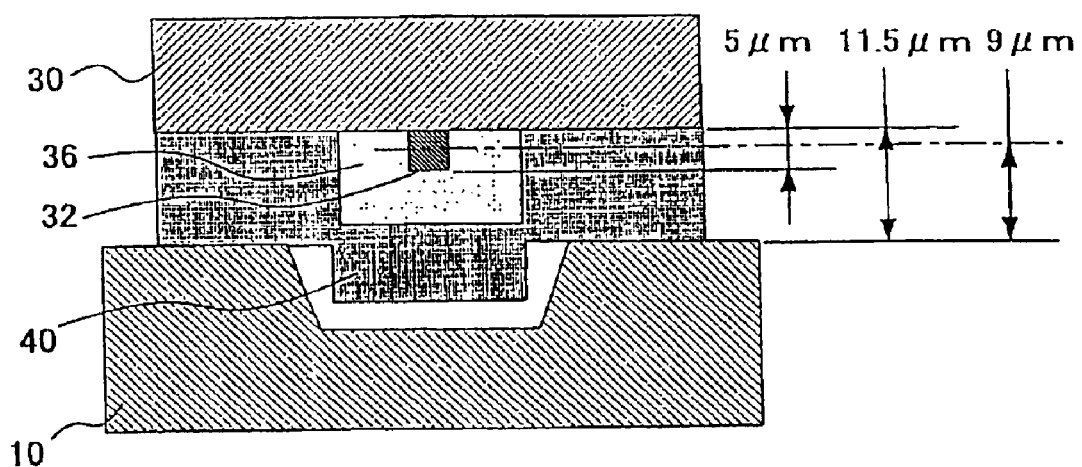
FIG. 7 is a sectional view of the light waveguide element mounted on the mount board.

In FIG. 7, the optical waveguide element described above is mounted on the same silicon substrate as that of optical fibers and other photoelectric components. Where semiconductor lasers and photodiodes having an optical axis height of 9.0 $\mu$m from the standard surface of the silicon substrate are used, the required thickness of the second clad layer for adjusting the height of the optical waveguide element is 11.5 $\mu$m that is equal to the sum of the above 9.0 $\mu$m and a half of the core film thickness or 2.5 $\mu$m (5.0/2 $\mu$m). Thus, the second clad layer made to have a thickness of 11.5 $\mu$m matches the optical axis height of the semiconductor lasers and photodiodes.

In the plasma CVD, it is possible to control the formation of a quartz film to be about 0.1 $\mu$m/minute so that it is possible to form the desired film thickness precisely by controlling the film formation time. In addition, it is possible to assure the film thickness uniformity of ±0.2 $\mu$m for the average film thickness of 10 $\mu$m within a 3"-diameter substrate so that the increase in connection loss of the semiconductors lasers and photodiodes resulting from variations of the optical axis height due to variations in the film thickness are negligible. Furthermore, the thickness of the upper clad layer around the core is 16.5 $\mu$m that is equal to the sum of the thickness of the first and second upper clad layers (5.0 $\mu$m+11.5 $\mu$m) so that it is possible to assure the film thickness no less than 15 $\mu$m that is necessary for light propagation characteristics.

Second Embodiment

Figure 8A:
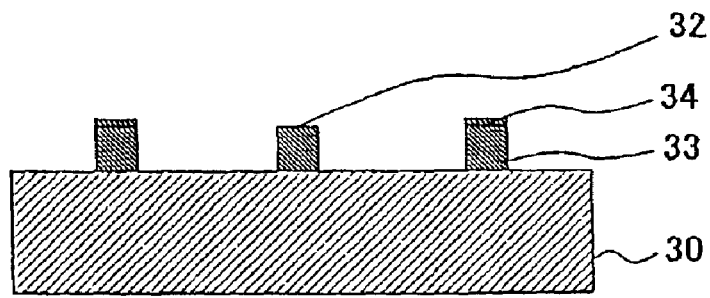
FIGS. 8(a)–(e) show how to make a light waveguide element according to the second embodiment of the invention.

In FIG. 8(a), a core 32 and the first height-adjusting layer 33 are formed on the lower clad layer or substrate 30, and an etching stopper film 34 is formed on the first height-adjusting layer 33. The thickness of each of the core 32 and the first height-adjusting layer 33 is 5.0 $\mu$m. The etching stopper film 34 also works as a marker for matching the optical axis in the direction of a plane on which the light waveguide element is mounted.

Figure 8B:
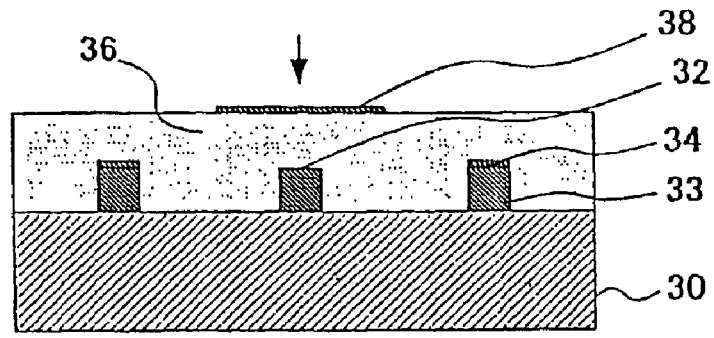
Figure 8C:
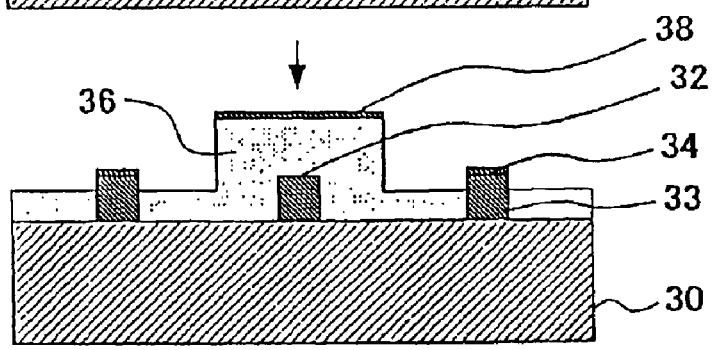

In FIG. 8(b), the first upper clad layer or quartz film 36 having a thickness of 10 $\mu$m is formed and, then, an etching mask 38 is formed to cover the area above the core 32. Then, the portion of the first upper clad layer 36 other than the area covered by the etching mask 38 is etched off. It is continued until at least the etching stopper film 34 is exposed as shown in FIG. 8(c).

Figure 8D:
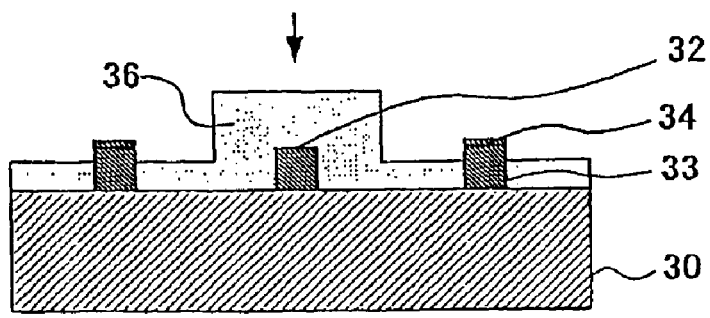

In FIG. 8(d), photolithography and etching are employed to remove the etching mask 38.

Figure 8E:
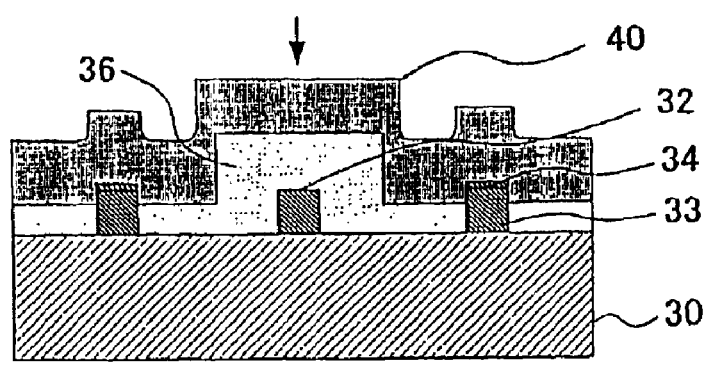
Figure 9:
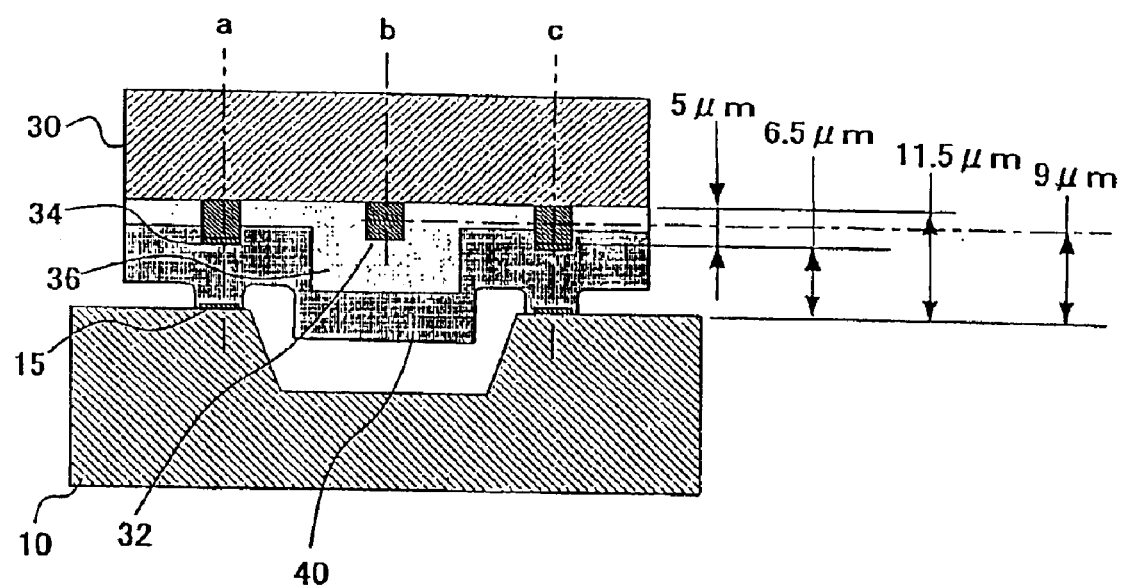
FIG. 9 is a sectional view of the light waveguide element mounted on the mount board according to the second embodiment.

In FIG. 8(e), the second upper clad layer or quartz film 40 having a thickness of 6.5 $\mu$m is formed. In FIG. 9, the above optical waveguide element is mounted in the same silicon substrate as that of the optical fibers and photoelectric components to which the optical waveguide element is connected. Where the semiconductor lasers and photodiodes having an optical axis height of 9.0 $\mu$m from the standard surface are used, the required film thickness of the first height-adjusting layer 33 and the second upper clad layer 40 is 11.5 $\mu$m or the sum of 9.0 $\mu$m and a half of the core film thickness or 2.5 $\mu$m. The thickness of the first height-adjusting layer 13 and the second upper clad layer are made 5.0 μm and 6.5 μm, respectively, so that it is possible to match the optical axis height of the semiconductor lasers and the photodiodes. Where the thickness of the etching stopper film 34, which is usually no more than 1 μm, is not negligible, correction should be made as needed.

The thickness of the upper clad layer above the core is the sum of the thickness of the first and second upper clad layers or 16.5 μm (=10.0 μm+6.5 μm) so that it is possible to provide the film thickness required for light propagation characteristics or 15 μm or more.

The etching stopper film 34 is formed by the photolithography that uses the same photomask as that of the core 32 so that it also serves as a marker for precisely matching the optical axis in the horizontal direction with respect to the core position. That is, as shown in FIG. 9, the relative positions a, b, and c are formed so precisely that if the alignment markers 15 of the silicon substrate are aligned with the positions a and c, the optical axis position b, which is the center of the core, is aligned precisely with the optical axis in the horizontal direction of the optical fiber 12 and photoelectric components 13.

Third Embodiment

Figure 10A:
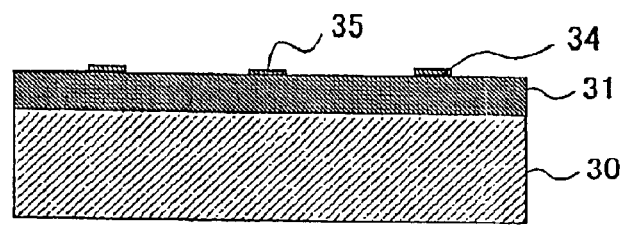
FIGS. 10(a)–(f) show how to make a light waveguide element according to the third embodiment of the invention.

In FIG. 10(a), a core film 31 is formed on a lower clad layer or substrate 30, and an etching stopper film 34, which also serves as horizontal optical axis-matching markers, and a core pattern-forming etching mask 35 are formed on the core film 31. The thickness of the core film 31 is made 5.0 μm.

Figure 10B:
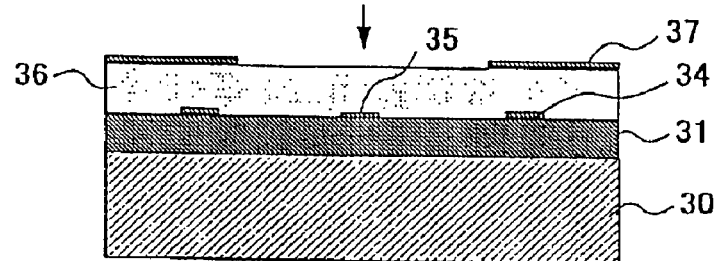
Figure 10C:
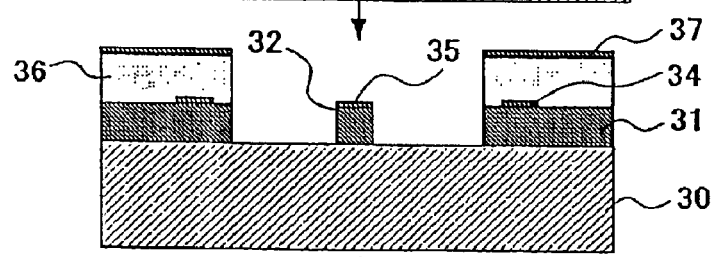

In FIG. 10(b), the first upper clad layer or quartz film 36 having a thickness of 6.5 μm is formed and, then, a marker-etching mask 37 is formed so as to cover the area above the etching stopper film 34. Then, the portion of the first upper clad layer 36 and the core film 31 other than the area covered by the marker-etching mask 37 are etched off. It is continued until at least the portion of the core film 31 is removed as shown in FIG. 10(c).

Figure 10D:
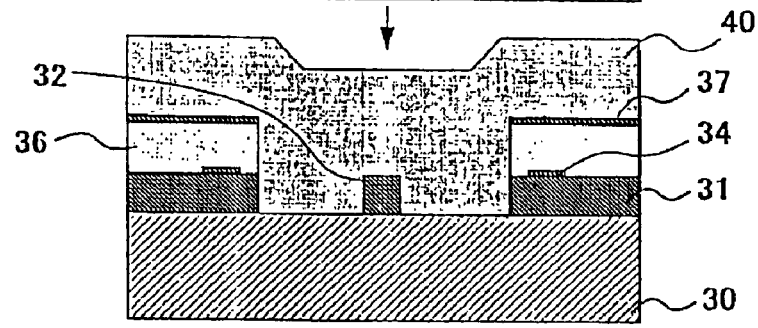

In FIG. 10(d), photolithography and etching are used to remove only the etching mask 35 from the core 32 and, then, the second upper clad layer or quartz film 40 having a thickness of 15 μm is formed.

Figure 10E:
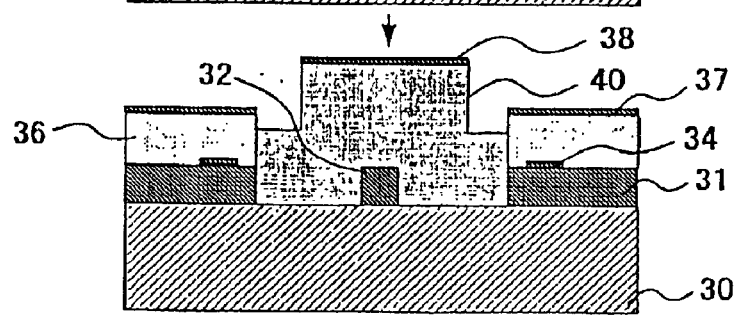

In FIG. 10(e), an etching mask 38 is formed so as to cover the area above core 32 and, then, the portion of the second upper clad layer 40 other than the area covered by the etching mask 38 is etched off. It continues until at least the marker-etching mask 37 is exposed.

Figure 10F:
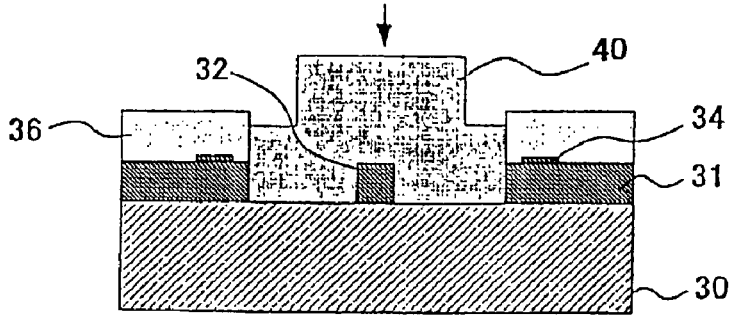

In FIG. 10(f), the marker-etching mask 37 and the etching mask 38 are removed.

Figure 11:
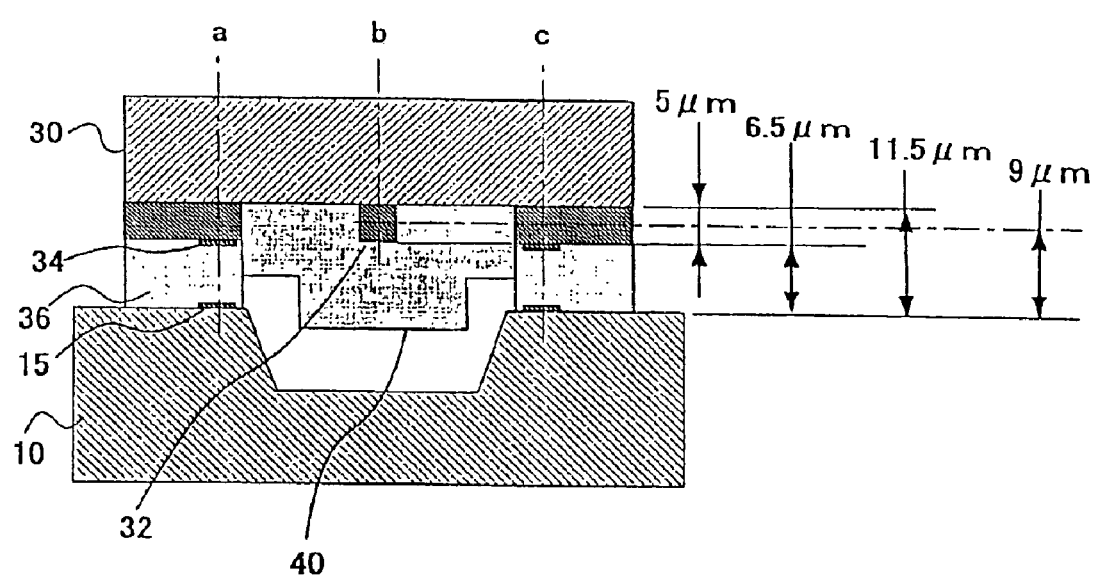
FIG. 11 is a sectional view of the light waveguide element mounted on the mount board according to the third embodiment.

In FIG. 11, the above optical waveguide element 11 is mounted in the same substrate 10 as that of the optical fiber 12 and the photoelectric component 13 to which the optical waveguide element 11 is connected. Where a semiconductor laser and photodiode having an optical axis height of 9.0 μm from the standard plane of the silicon substrate are used, the required thickness of the core film 32 and the first upper clad layer 36 is 11.5 μm that is equal to the sum of 9.0 μm and 2.5 μm or a half of the thickness of the core film 32. The core film thickness and the first upper clad layer thickness are made 5.0 μm and 6.5 μm, respectively, so that it is possible to match the optical axis height of the semiconductor laser and the photodiode. Where the thickness of the etching stopper film 34, which is usually 1 μm or less, is not negligible, correction should be made as needed.

The thickness of the second clad layer or the upper clad layer above the core is 15 μm so that the thickness required for light propagation characteristics or 15 μm is assured. The marker or etching stopper film 34 is formed by the photolithography using the same photomask as that of the core 32 so that it also serves as a precise marker for matching the horizontal optical axis with respect to the core position. That is, as shown in FIG. 11, the relative positions a, b, and c are formed so precisely that if the alignment marker 15 of the silicon substrate 10 is aligned with the relative positions a and c, the optical axis position b, which is the center of the core 32, is aligned precisely with the horizontal optical axis of the optical fiber 12 and the photoelectric component 13. Unlike the second embodiment, the core film around the marker 34 is not etched off so that good observation is assured in the image process for detecting the marker edge upon mounting the light waveguide element 11.

As has been described above, according to the invention, it is possible to provide not only an upper clad layer sufficiently thick for light propagation characteristics but also optical axis height adjusting-sections with the thickness determined by only the thickness of the upper clad layer and the core, eliminating the etching step thus any influence of variations in the etching and its rate. The film is formed by plasma CVD so that the resulting light waveguide element is made precisely without difficulty at high yields. The use of the same photolithography as that of the core formation, to form the alignment markers makes precise horizontal optical-axis alignment possible.

What is claimed is:

1. A process for making a light waveguide element mounted on a mount board along with an optical fiber and photoelectric components, comprises:

forming a core as a light path on a substrate serving as a lower clad layer; and forming a T-shaped upper clad layer having a central section elevated from optical axis height-adjusting side sections to cover said core, wherein said T-shaped upper clad layer-forming step comprises:

patterning, subsequent to said core-forming step, an etching stopper film on opposite sides of said core including an area of said optical axis height-adjusting side sections;

forming a first upper clad layer over an entire surface including said etching stopper film, said core, and said substrate;

forming an etching mask on said first upper clad layer so as to cover an area above said core;

etching off a portion of said first upper clad layer that is other than said area covered by said etching mask until said etching stopper film is exposed;

removing said etching stopper film and said etching mask; and forming a second upper clad layer over an entire surface including said first upper clad layer and said substrate.

2. The process according to claim 1, wherein said T-shaped upper clad layer is made sufficiently thick to provide light propagation characteristics.

3. The process according to claim 2, wherein said T-shaped upper clad layer is made 15 μm thick or more.

4. The process according to claim 1, wherein said optical axis height-adjusting side sections are made so as to have a thickness from said lower clad layer equal to a sum of a half of a thickness of said core and an optical axis height of said optical fiber and said photoelectric components.

5. The process according to claim 1, wherein said core and said upper clad layer are made by plasma chemical vapor deposition.

* * * * *